(12) United States Patent
Bishop

(10) Patent No.: US 10,986,783 B2
(45) Date of Patent: Apr. 27, 2021

(54) HAY FLUFFER WITH REMOVABLE TINES

(71) Applicant: Lynn Bishop, Manti, UT (US)

(72) Inventor: Lynn Bishop, Manti, UT (US)

( * ) Notice: Subject to any disclaimer, the term of this patent is extended or adjusted under 35 U.S.C. 154(b) by 393 days.

(21) Appl. No.: 15/976,897

(22) Filed: May 11, 2018

(65) Prior Publication Data

US 2019/0343050 A1 Nov. 14, 2019

(51) Int. Cl.
*A01D 78/00* (2006.01)
*A01D 80/02* (2006.01)

(52) U.S. Cl.
CPC .......... *A01D 80/02* (2013.01); *A01D 78/006* (2013.01)

(58) Field of Classification Search
USPC .......................................................... 56/372
See application file for complete search history.

(56) References Cited

U.S. PATENT DOCUMENTS

| | | | | | |
|---|---|---|---|---|---|
| 2,438,707 | A * | 3/1948 | Kropp | .................. | A01B 33/144 172/96 |
| 2,548,329 | A * | 4/1951 | Van Sickle | .......... | A01D 89/002 56/364 |
| 2,551,313 | A * | 5/1951 | Brinson | .................. | A01B 23/00 172/556 |
| 2,559,862 | A * | 7/1951 | Ferguson | ............... | A01D 78/02 56/372 |
| 2,909,888 | A * | 10/1959 | Van Der Lely | ........ | A01D 80/02 56/377 |
| 3,120,092 | A * | 2/1964 | Van Der Lely | ...... | C07D 213/73 56/400 |
| 3,127,727 | A * | 4/1964 | Van Der Lely | ........ | A01D 78/02 56/372 |
| 4,344,273 | A * | 8/1982 | Jobling | ................ | A01B 45/026 56/16.7 |
| 4,524,576 | A * | 6/1985 | Probst | .................... | A01D 84/00 56/364 |
| 5,657,707 | A * | 8/1997 | Dresher | ................. | A01B 35/28 111/139 |
| 6,164,052 | A * | 12/2000 | Golay | .................... | A01D 84/00 56/366 |
| 6,715,275 | B1 * | 4/2004 | Kuehn | ................... | A01D 80/02 56/400 |

* cited by examiner

*Primary Examiner* — Thomas B Will
*Assistant Examiner* — Mai T Nguyen
(74) *Attorney, Agent, or Firm* — Malone IP Law; Steven J. Malone

(57) ABSTRACT

The presented invention is a hay fluffer which includes a frame that is configured to be pulled by a vehicle and a drive assembly supported by the frame. The drive assembly consists of wheels whose rotation, using a system of chains and gears, powers the turn of a rotation shaft. The rotation shaft has, attached, a sequence of cogs with each cog containing three recesses equally spaced and a tine set fitted into each of the three recesses in each cog. Tine sets may be removed and replaced by removing a single reversible fastener.

19 Claims, 4 Drawing Sheets

HAY FLUFFER WITH REMOVABLE TINES

FIELD OF THE INVENTION

The present invention discloses a hay fluffer with structural features which allow for easy maintenance and operation to help in the process of curing or drying hay.

BACKGROUND

The process of harvesting hay and straw includes the need to dry out or cure the cut product. A need exists for an easily serviceable hay fluffer.

SUMMARY

The presented invention is a hay fluffer which includes a frame that is configured to be pulled by a vehicle and a drive assembly supported by the frame. The drive assembly consists of wheels whose rotation, using a system of chains and gears, powers the turn of a rotation shaft. The rotation shaft has, attached, a plurality of cogs with each cog containing three recesses equally spaced, and a tine set fitted into each of the three recesses in each cog. Tine sets may be removed and replaced by removing a single reversible fastener.

The cogs may be between four and ten inches in diameter and each have a through hole in the center with a radius of one to three inches. The three recesses in each of the cogs may be spaced equally from each other with the vertices lying at 120 degrees apart. The three recesses may be acute slots or crevices with a measurement of between 45 degrees to 75 degrees, generally matching the bend of the tine sets. The cog recesses may be enclosed on four sides to secure the tine sets with a single fastener. Creating the recesses may include a combination of milling, welding, cutting, grinding, or stamping.

The fastener may be a pin or bolt of a quarter inch to a half inch size or a clamp or any other securing method that secures the tine sets into the cog recesses. The removable fastener may secure the tine sets in place by passing perpendicularly through the cog and cog recess. Tine sets may be removed and replaced by removing a single removable fastener. The fastener may also act as a supportive device in retaining the acute angle of the tine sets. Each of the tine sets may be one continuous eighth inch to half inch rod bent at an acute angle of 45 degrees to 75 degrees. Each tine in the tine sets may be curved in a semi-circular fashion, and all follow the same direction. The bend and curves of each tine set may be such that when positioned in the cog recesses, the ends of the tines of the three tine sets may be equally distanced from one another.

The rotating shaft may be made of a rod or pipe of one inch to three inches in diameter and may be attached through at least ten cogs. The movement of the machine may power the rotation of the rotating shaft by turning the wheels and the chain and gears. The frame may be constructed of wood, plastic, or metal and may include a hitch tongue. The pulling vehicle may be any variety of motorized or manual vehicle or a load-bearing animal.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings.

Figure 1:
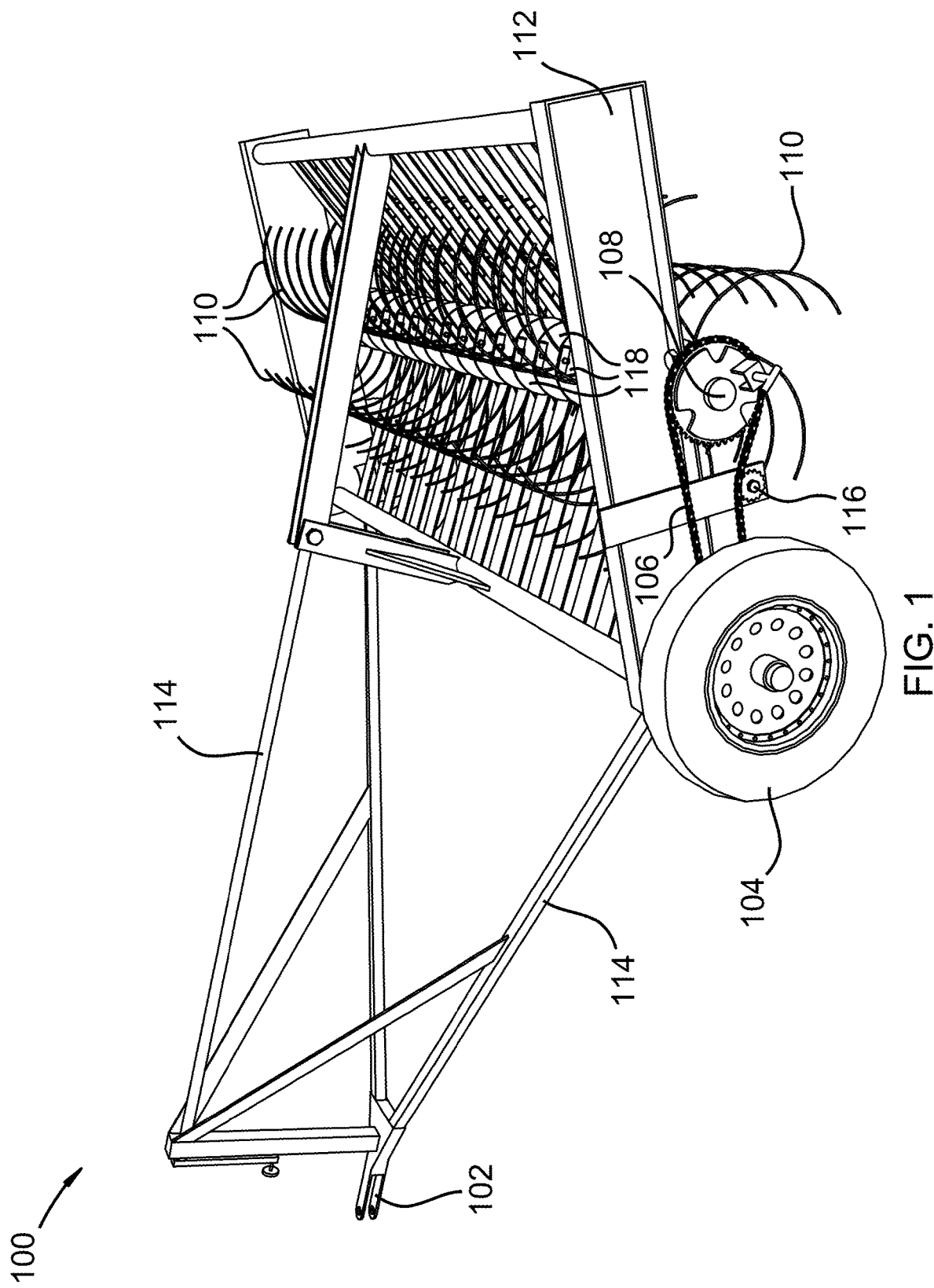
FIG. 1 shows a side view of the complete hay fluffer in accordance with an embodiment of the invention.

FIG. 1 shows a side view of the hay fluffer 100 consisting of a frame 112, that may be pulled by a motorized vehicle or a load-bearing animal, connected to the hitch tongue 102 and supports 114. At least one wheel 104 may power a rotating shaft 108 by way of a chain 106 and drive gear 116. The rotating shaft 108 goes through a plurality of cogs 118, which may be of at least ten cogs 118, with a plurality of tine sets 110 attached. As the machine moves forward, at least one wheel 104 turns the chain 106 and drive gear 116 to cause the rotating shaft 108 to turn. As the rotating shaft 108 turns, the attached cogs 118 turn, causing the tine sets 110 to scratch the ground, picking up and turning hay or straw. The width of the machine 100 may be 4 to 8 feet, allowing for use with a small vehicle or a load-bearing animal. An embodiment of the invention 100 would allow for easy use without a large tractor or expensive equipment. The size of the hay fluffer 100 is relatively small, light, and easy to manage. The chain 106 and gear 116 system allows the machine 100 to function without a motor source from the vehicle. The vehicle can be anything with enough strength to pull the hay fluffer 100. The design of the tine sets 110 and cogs 118 allow for easy replacement of any damaged tines with just one tool and without extensive time and work. Cogs 118 may not need to be removed or taken apart to replace the tine sets 110, there may be only one step for removal and one more for replacement.

Figure 2:
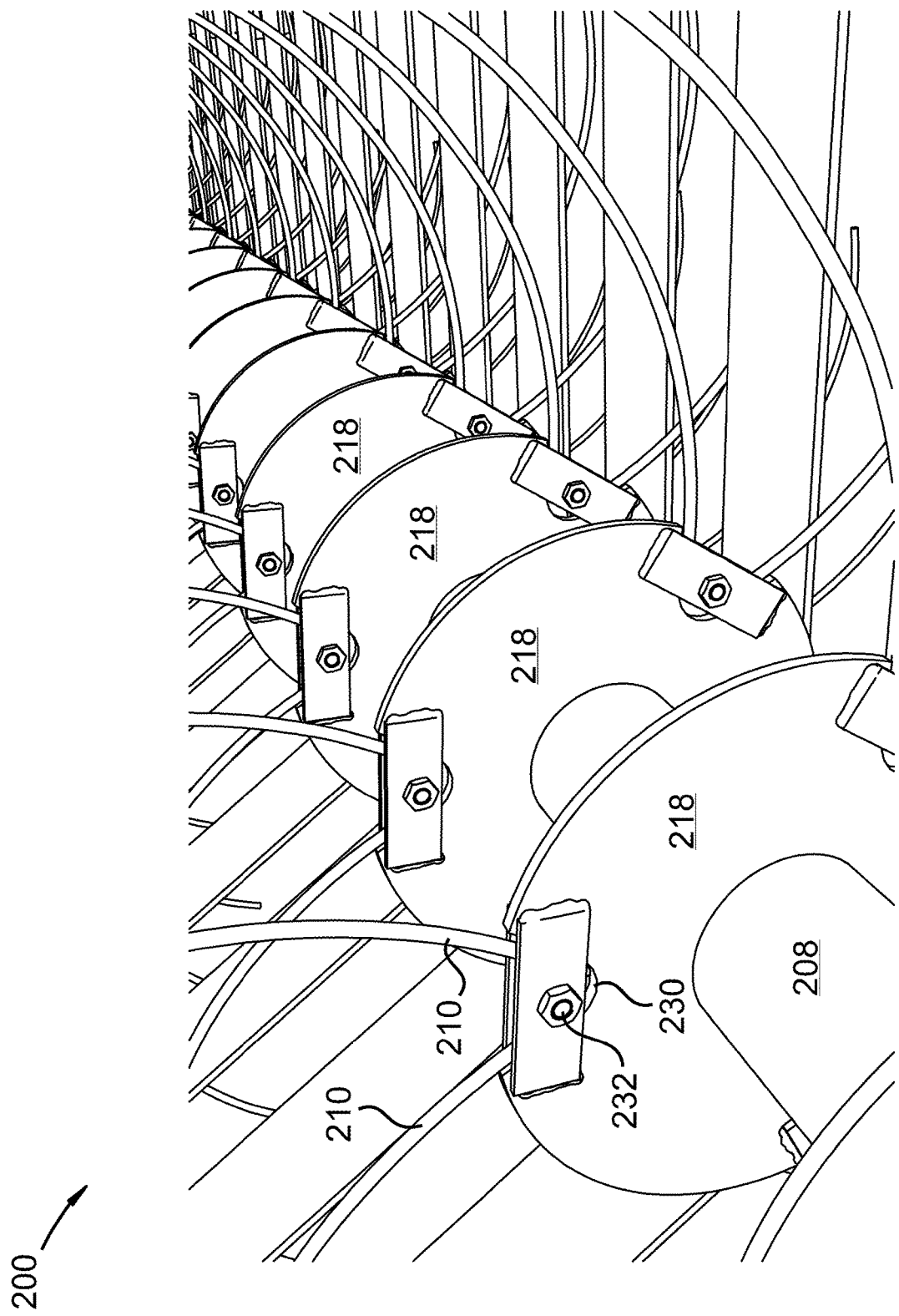
FIG. 2 shows a close view of the rotating shaft, cogs, and tine sets in accordance with an embodiment of the invention.

FIG. 2 shows the design of the cog 218 that allows tine sets 210 to be easily replaced. Each tine set 210 may be formed by a single rod bent in an acute angle. The acute bend in the tine sets 210 allows for a snug fit into the cog recesses 230. Each of the three cog recesses 230 may be enclosed on at least four sides to secure the tine sets 210. The single, removable fastener 232 secures the tine sets 210 securely and retains a single, easy, access step to replace possibly damaged tine sets 210. Each cog 218 is spaced equally along the rotating shaft 208 to ensure thorough turning of hay. Each cog 218 may be attached to the rotating shaft 208 by welding or any other method.

Figure 3:
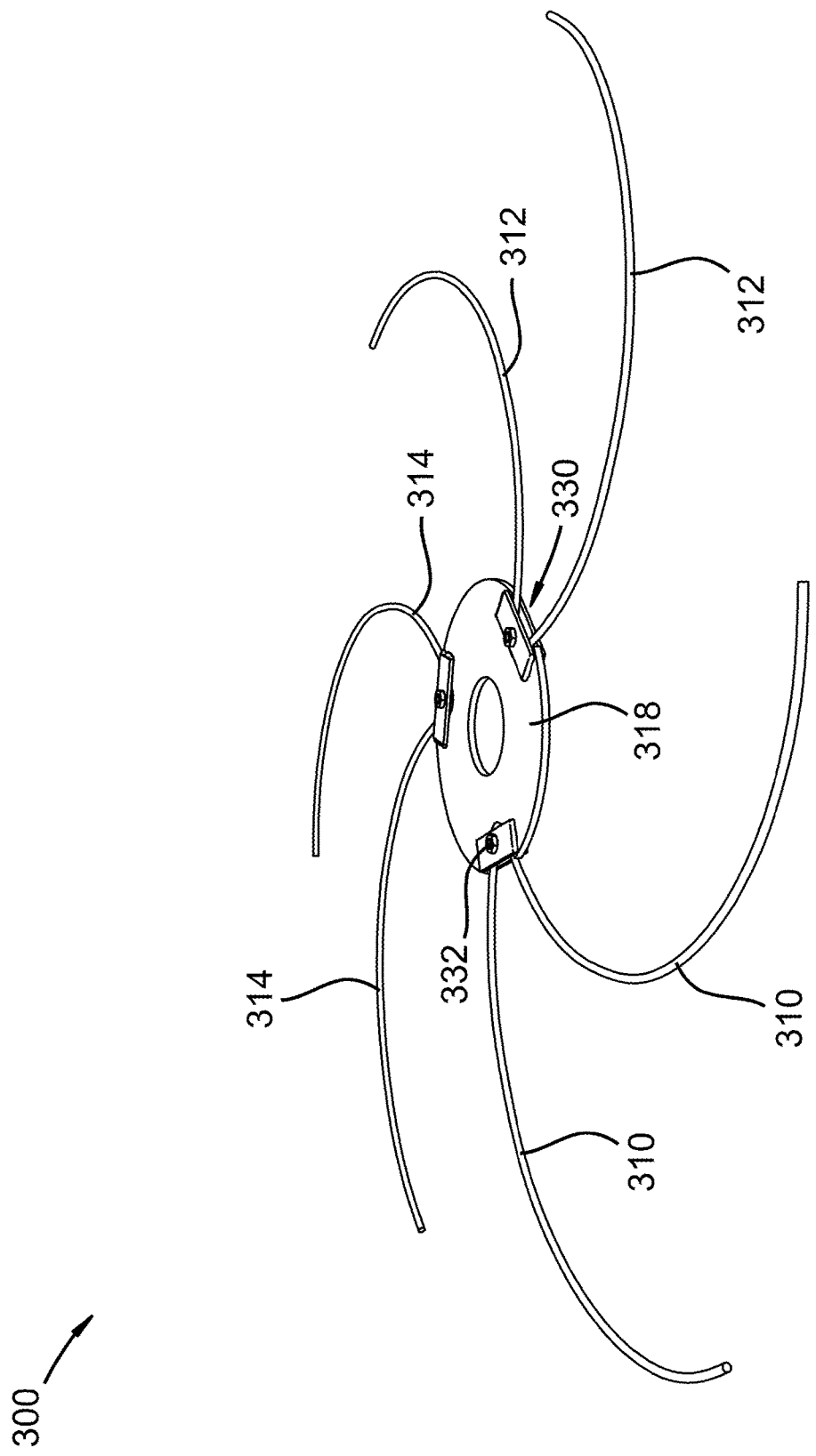
FIG. 3 shows a cog and tine sets in accordance with an embodiment of the invention.

FIG. 3 shows the cog 318 and tine sets 310, 312, and 314 in accordance with an embodiment of the invention. The semi-circular curves of each of the tine sets 310, 312, 314 allow for scooping up pieces of hay or straw. Each of three tine sets 310, 312, and 314 may fit securely into the cog recess 330 and may be secured by a fastener 332 which could be a threaded bolt and nut or a linchpin. Tine set 310, as a continuous rod, forms two working tines which allows for easy securing and easy replacement, the same applies to tine sets 312 and 314. The cog recess 330 may be formed by a cut out shape with welded enclosing pieces. Or the cog recess 330 could be an impression in the cog 318 wherein the tines sets 310, 312, and 314 fit securely with a fastener 332 holding them in place. The cog recess 330 may be any other form of cavity or space to secure the tine sets 310, 312, and 314. The cog 318 may be four to ten inches in diameter and constructed of a metal plate with a through hole of one to three inches. The cog could be circular, triangular or any other functioning shape. The cog recess 330 may fit the general angle of the acute bend of the tine sets 310, 312, 314. The acute bend and the semi-circular curve of the tine set may cause an equal distance from each end of the tine set 310 and the ends of the other tine sets 312 and 314.

Figure 4:
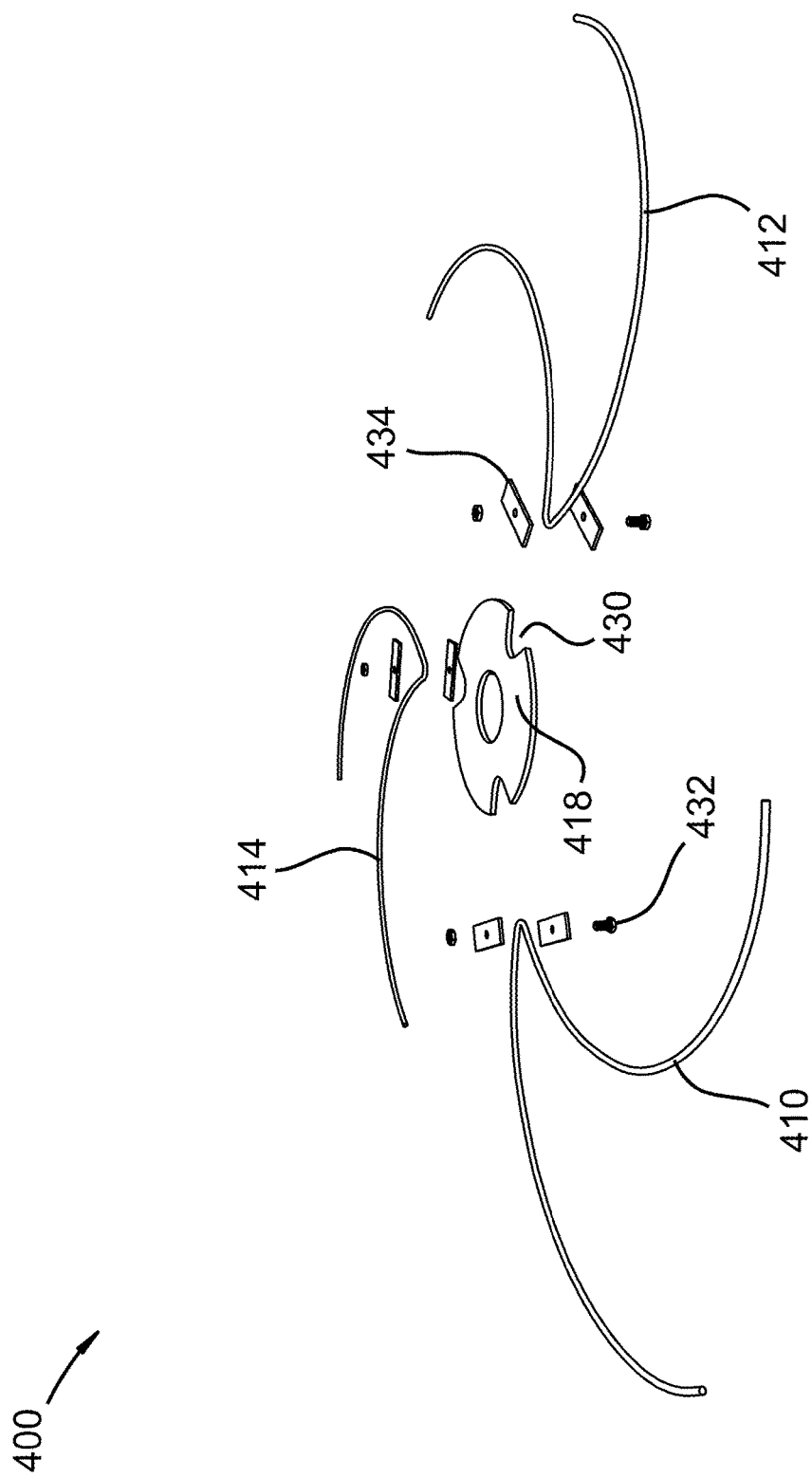
FIG. 4 shows an exploded view of a cog and tine sets in accordance with an embodiment of the invention.

FIG. 4 shows an exploded view of the cog 418 and tine sets 410, 412, and 414 in accordance with an embodiment of the invention. Each tine set may be secured by a single fastener 432. The cog recess may be formed by a cutout 430 with plates 434 welded on to form a slot enclosed on at least four sides for the tine sets. Other methods of creating the cog recesses may include grinding, milling, stamping, cutting, welding, or any combination of methods. Each cog recess of the three cog recesses may be equidistantly spaced at 120 degrees apart from the vertices of the other two. A tine set 410 may be formed by taking an eighth inch to half inch in diameter rod, bending it near the middle at a 45 to 75 degree angle and further bending each side in a semi-circular curve. The securing fastener 432 may support the acute bend of the tine set 410 by holding the angle apart, and against the cog recess.

The systems and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A hay fluffer comprising:
a frame that is configured to be pulled by a vehicle;
a drive assembly supported by the frame for propelling the hay fluffer;
the drive assembly comprising:
a rotating shaft powered by a chain, a drive gear, and the rotation of at least one wheel of the hay fluffer;
a plurality of cogs attached to the rotating shaft, each cog of the plurality of cogs containing three recesses equidistantly spaced around a circumference of each cog;
a plurality of tine sets, each tine set of the plurality of tine sets containing an acute bend matching at least one of the three recesses of each of the plurality of cogs;
wherein a tine set of each of the plurality of tine sets is secured in a recess of the three recesses of a cog of the plurality cogs by a single, removable fastener; and
wherein each tine set of the plurality of tine sets is one continuous rod, bent to an acute angle of between 45 degrees to 75 degrees.

2. The hay fluffer of claim 1, each of the three recesses of each of the plurality of cogs generally match the acute bend of a tine set of the plurality of tine sets.

3. The hay fluffer of claim 1, wherein each cog of the plurality of cogs have a center through hole with a radius between one to three inches and each cog of the plurality of cogs are between four inches and ten inches in diameter.

4. The hay fluffer of claim 2, wherein each of the tine sets of the plurality of tine sets comprise a continuous rod having a diameter between an eighth inch and a half inch.

5. The hay fluffer of claim 1, wherein the removable fastener is a bolt or pin.

6. The hay fluffer of claim 2, wherein each of the three recesses of each of the plurality of cogs are at least partially enclosed on at least four sides.

7. The hay fluffer of claim 1, wherein the vehicle is any form of motorized vehicle, manual vehicle, or load-bearing animal.

8. The hay fluffer of claim 1, wherein the rotating shaft is constructed of a rod or pipe.

9. The hay fluffer of claim 1, wherein the rotation of the rotating shaft is powered by movement of the hay fluffer.

10. The hay fluffer of claim 4, wherein each of the tine sets of the plurality of tine sets have a semi-circular curve in each tine of each tine set of the plurality of tine sets.

11. The hay fluffer of claim 1, wherein the removable fastener perpendicularly passes completely through the cog recess of the plurality of cog recesses and the cog of the plurality of cogs to secure the tine set of the plurality of tine sets.

12. The hay fluffer of claim 11, wherein each of the three recesses of each of the plurality of cogs are formed by milling, welding, cutting, stamping, grinding, or a combination thereof.

13. The hay fluffer of claim 10, wherein the semi-circular curve in each tine of each tine set of the plurality of tine sets curve in the same direction.

14. The hay fluffer of claim 1, wherein the frame is constructed of wood, plastic, or metal.

15. The hay fluffer of claim 7, wherein the frame further comprises a hitch tongue.

16. The hay fluffer of claim 1, wherein the removable fastener supports the acute angle of each tine set of the plurality of tine sets.

17. The hay fluffer of claim 16, wherein the acute bend and the semi-circular curve in each tine of each tine set of the plurality of tine sets cause an equal distance between the ends of each of the tine sets of the plurality of tine sets.

18. The hay fluffer of claim 1, wherein each of the three recesses of each of the plurality of cogs have vertices distanced at or near 120 degrees.

19. The hay fluffer of claim 1, wherein the plurality of cogs comprise at least ten or more cogs.

* * * * *